United States Patent
Kanaya et al.

(10) Patent No.: US 9,500,257 B2
(45) Date of Patent: Nov. 22, 2016

(54) FLUID-FILLED VIBRATION DAMPING DEVICE

(71) Applicant: TOKAI RUBBER INDUSTRIES, LTD., Komaki-shi, Aichi (JP)

(72) Inventors: Tomohiro Kanaya, Kasugai (JP); Eisuke Asano, Komaki (JP)

(73) Assignee: SUMITOMO RIKO COMPANY LIMITED, Aichi (JP)

(*) Notice: Subject to any disclaimer, the term of this patent is extended or adjusted under 35 U.S.C. 154(b) by 0 days.

(21) Appl. No.: 14/184,329

(22) Filed: Feb. 19, 2014

(65) Prior Publication Data

US 2014/0291905 A1   Oct. 2, 2014

(30) Foreign Application Priority Data

Mar. 29, 2013  (JP) .................................. 2013-073188

(51) Int. Cl.
*F16F 5/00*  (2006.01)
*F16F 13/10*  (2006.01)

(52) U.S. Cl.
CPC ............ *F16F 13/10* (2013.01); *F16F 2224/04* (2013.01)

(58) Field of Classification Search
CPC .... F16F 13/007; F16F 2224/04; F16F 13/06; F16F 7/1034
USPC ........................................ 267/140.13, 140.14
See application file for complete search history.

(56) References Cited

U.S. PATENT DOCUMENTS

| 4,504,044 | A | * | 3/1985 | Shtarkman ...................... 267/35 |
| 4,509,730 | A | * | 4/1985 | Shtarkman ...................... 267/35 |
| 7,306,210 | B2 | | 12/2007 | Happou et al. |
| 7,549,619 | B2 | * | 6/2009 | Ohki ...................... F16F 9/103 248/562 |
| 2011/0155887 | A1 | | 6/2011 | Ueki |
| 2012/0139174 | A1 | * | 6/2012 | Matsumoto et al. .... 267/140.13 |

FOREIGN PATENT DOCUMENTS

| JP | U-63-102805 | 7/1988 |
| JP | A-2005-337348 | 12/2005 |
| JP | 2010286028 A * | 12/2010 |
| JP | B2-5011247 | 8/2012 |

OTHER PUBLICATIONS

Machine translation of JP 2010286028.*

* cited by examiner

*Primary Examiner* — Robert A Siconolfi
*Assistant Examiner* — Mahbubur Rashid
(74) *Attorney, Agent, or Firm* — Oliff PLC

(57) ABSTRACT

A fluid-filled vibration damping device including: a primary fluid chamber which gives rise to internal pressure fluctuations based on deformation of a main rubber elastic body at times of vibration input; an auxiliary fluid chamber which gives rise to pressure differentials relative to the primary fluid chamber at times of vibration input; an orifice passage which permits a non-compressible sealed fluid filling the primary fluid chamber and the auxiliary fluid chamber to flow between the two fluid chambers; and an insoluble powder mixed in the sealed fluid filling the primary fluid chamber which provides a bubble nucleus and accelerates dispersed generation of bubbles when pressure within the primary fluid chamber is decreased.

10 Claims, 3 Drawing Sheets

FLUID-FILLED VIBRATION DAMPING DEVICE

INCORPORATED BY REFERENCE

The disclosure of Japanese Patent Application No. 2013-073188 filed on Mar. 29, 2013 including the specification, drawings and abstract is incorporated herein by reference in its entirety.

BACKGROUND OF THE INVENTION

1. Field of the Invention

The present invention relates generally to a fluid-filled vibration damping device for use in an automotive engine mount or the like, for example, and more particularly, to techniques capable of providing an effective and simple solution for noises caused by cavitation generated in association with input of impact load or the like.

2. Description of the Related Art

Conventionally, as one type of vibration damping devices such as vibration damping connectors or vibration damping supports configured to be interposed between components that make up a vibration transmission system, there have been known fluid-filled vibration damping devices that utilize vibration damping effect on the basis of flow action of the fluid filling the interior. Such fluid-filled vibration damping devices, as disclosed in Japanese Unexamined Patent Publication No. JP-A-2005-337348 for example, have a structure including a primary fluid chamber which gives rise to pressure fluctuations based on deformation of a main rubber elastic body at times of vibration input, an auxiliary fluid chamber which gives rise to pressure differentials relative to the primary fluid chamber at times of vibration input, and an orifice passage which permits communication between the two chambers. With this arrangement, vibration damping effect will be exhibited on the basis of flow action of a non-compressible sealed fluid which is induced to flow through the orifice passage between the primary fluid chamber and the auxiliary fluid chamber which give rise to pressure differentials relative to each other at times of vibration input.

Meanwhile, with such a fluid-filled vibration damping device, noises or vibrations generated at input of impact load may sometimes be a problem. These noises etc. are attributed to cavitation bubbles generated by a sudden drop of pressure in the primary fluid chamber due to the input of impact load.

To address this problem, as disclosed in U.S. Pat. No. 7,306,210, proposed is a structure which includes a short-circuit passage equipped with a relief valve or the like between the primary fluid chamber and the auxiliary fluid chamber so as to rapidly dispel the excessive negative pressure within the primary fluid chamber.

However, since this structure requires the relief valve, the short-circuit passage, or the like specially, there is a problem that an increased number of components or a complicated construction are inevitable.

Also, U.S. Publication No. US2011/0155887 discloses techniques in order to minimize cavitation by adding a small amount of liquid having a high vapor pressure (a low boiling point), such as silicone oil or the like, into the sealed fluid such as ethylene glycol or the like.

However, since the liquid having a high vapor pressure boils under the environment of relatively low temperature, there is a problem that the environment suitable for using the vibration damping device is limited. In particular, it is never desirable to employ the vibration damping device as a vibration damping device for automobiles which have an internal combustion engine and many of which are used in direct sunlight. Thus, implementation in an automotive engine mount, for example, is difficult because the engine compartment is likely to heat up.

SUMMARY OF THE INVENTION

It is therefore one object of this invention to provide techniques capable of providing a simple and effective solution for noises caused by cavitation generated in association with input of impact load or the like.

Specifically, a first mode of the present invention provides a fluid-filled vibration damping device including: a primary fluid chamber which gives rise to internal pressure fluctuations based on deformation of a main rubber elastic body at times of vibration input; an auxiliary fluid chamber which gives rise to pressure differentials relative to the primary fluid chamber at times of vibration input; an orifice passage which permits a non-compressible sealed fluid filling the primary fluid chamber and the auxiliary fluid chamber to flow between the two fluid chambers; and an insoluble powder mixed in the seated fluid filling the primary fluid chamber which provides a bubble nucleus and accelerates dispersed generation of bubbles when pressure within the primary fluid chamber is decreased.

With the fluid-Oiled vibration damping device according to the above first mode, since the insoluble powder provides a bubble nucleus, a gas is readily released from the sealed fluid. Therefore, when the pressure in the primary fluid chamber has considerably dropped due to input of impact load, a multitude of bubbles will be accelerated to generate around the bubble nuclei provided in plurality before large bubbles grow caused by a phenomenon of boiling of the sealed liquid known as so-called cavitation. By so doing, the multitude of bubbles will absorb and reduce the negative pressure within the primary fluid chamber, so as to avoid a marked pressure drop therein. This will prevent generation of large bubbles doe to cavitation, thereby minimizing noises or vibrations that occur during disappearance of the huge bubbles.

Whereas the effect attained by the present invention will be apparent from the test results of Examples described later, it should be appreciated that, as the technical concept, the present invention is not for inhibiting release of the gas within the liquid which directly causes cavitation in order to prevent cavitation that generates a big pressure wave during disappearance of the bubbles. An important feature of the present invention is to allow the gas to be readily released within the liquid, based on the reverse idea. Specifically, as to water, the releasing phenomenon of the gas typically occurs when the pressure becomes lower than the saturated vapor pressure, which is around $1/50$ of the atmospheric pressure, for only a very short time. However, this releasing phenomenon of the gas is known to be less likely to occur without existence of the bubble nucleus which serves as a nucleus. The present invention does not aim to prevent existence of the bubble nucleus in order to minimize the releasing phenomenon of the gas, but on the contrary, provides a bubble nucleus so as to accelerate dispersed generation of the bubbles by mixing the insoluble powder in the liquid. By generating the bubbles under higher pressure than the saturated vapor pressure, a further pressure drop will be inhibited, making it possible to avoid cavitation of an extent such that a big shockwave is generated during disappearance of the bubbles.

Especially with the present invention, since the insoluble powder exists in a dispersed way within the liquid, the bubble nucleus will be provided over a wide area within the primary fluid chamber. As a result, at the time of input of impact load, bubbles will be generated in a dispersed way over the wide area within the primary fluid chamber. Therefore, the generated bubbles will be dispersed into an extremely small size, so that the impact arising from the disappearance of those bubbles can be further minimized, in addition to being made into extremely smaller energy than that of large bubbles.

Moreover, with the present invention, the insoluble powder is employed in order to provide the bubble nucleus and accelerate dispersed generation of the gas. This will neither considerably change the characteristics of the liquid itself, nor appreciably limit the conditions with respect to the usage environment of the fluid-filled vibration damping device such as temperature or the like.

Furthermore, the present invention is able to reduce noises or the like caused by cavitation without changing the basic structure such as the primary fluid chamber, the auxiliary fluid chamber, or the orifice passage.

Note that with the present invention, whether there is any dissolved gas or not in the non-compressible fluid filling the primary fluid chamber is no object. Specifically, because of being exposed to the external air during preparing process or injecting step thereof, there may be dissolved air, water or the like in the liquid configured to be the sealed fluid, or alternatively, the liquid may have a high purity in which no such dissolved gas exists. Besides, a sealed fluid in which a gas is actively dissolved can also be employed. By so doing, it is possible to adjust accelerating effect of dispersed generation of aeration bubbles by means of the insoluble powder according to the present invention.

A second mode of the present invention provides the fluid-filled vibration damping device according to the first mode wherein the powder is in a floating state within the sealed fluid in the primary fluid chamber at least at times of vibration input.

According to the second mode, at times of vibration input, the insoluble powder that provides the bubble nucleus is configured to be more efficiently positioned in a dispersed way over the wide area within the primary fluid chamber. This makes it possible to further disperse or reduce the gas generated in the primary fluid chamber.

A third mode of the present invention provides the fluid-filled vibration damping device according to the first or second mode wherein the sealed fluid is hydrophilic, and a surface of the powder is water repellent.

According to the third mode, the surface of the insoluble powder on which the bubbles emerge constitutes a low-adhesion energy surface. This will more effectively accelerate generation of the bubbles on the surface of the powder as well as inhibit extension of the emerged bubbles on the surface of the insoluble powder, so that the bubbles can be retained in a shape similar to a lens shape or a ball shape. As a result, the bubbles generated during pressure drop in the primary fluid chamber are prevented from joining with other bubbles or the like and becoming enlarged on the surface of the powder, thereby further improving and stabilizing prevention effect of generation of huge bubbles owing to the bubbles generated in a dispersed way.

A fourth mode of the present invention provides the fluid-tilled vibration damping device according to the third mode wherein the powder has a specific gravity greater than 1 with the sealed fluid as a standard, and some of the powder floats up without settling within the sealed fluid based on water repellency of the surface of the powder even in a stationary state.

According to the fourth mode, by adjusting the level of water repellency of the surface of the powder which has a specific gravity greater than the sealed fluid, it is possible to adjust the degree of floating up of the powder within the sealed fluid over a wider range and appropriately set the degree or the like of the dispersion.

A fifth mode of the present invention provides the fluid-filled vibration damping device according to any of the first through fourth modes wherein the powder is mixed at not less than 0.01 weight % in relation to the sealed fluid.

According to the fifth mode, as will be apparent from the test results of Examples described later, the technical effect of the present invention, namely, prevention of noises or the like owing to mixing of the powder can more effectively be obtained.

A sixth mode of the present invention provides the fluid-filled vibration damping device according to any of the first through fifth modes wherein the powder is mixed in an amount of not more than 100 parts by weight in relation to the sealed fluid.

According to the sixth mode, an adverse effect on fluidity of the sealed fluid or the like due to mixing of the powder can be avoided as practicably as possible.

A seventh mode of the present invention provides the fluid-filled vibration damping device according to any of the first through sixth modes wherein the powder has an average particle size of 0.01-5000 μm.

According to the seventh mode, in addition to avoiding an adverse effect on the fluidity of the sealed fluid or the like due to mixing of the powder as practicably as possible, a sufficient surface area of the bubbles can be efficiently obtained, while effectively ensuring dispersibility of the bubbles within the sealed fluid. Thus, effect by mixing of the powder, namely, dispersed generation acceleration of the bubbles by providing the bubble nucleus, can more advantageously be attained.

An eighth mode of the present invention provides the fluid-filled vibration damping device according to any of the first through seventh modes wherein the sealed fluid is hydrophilic, the powder is composed of a water-repellent material, and wafer repellency of the water-repellent material is exhibited on a surface of the powder.

According to the eighth mode, by utilizing the water repellency of the powder, the bubble nucleus will be more effectively provided within the hydrophilic sealed fluid. In particular, since the powder material itself has water repellency, the powder whose surface has water repellency is more efficiently produced.

A ninth mode of the present invention provides the fluid-filled vibration damping device according to any of the first through eighth modes wherein a water contact angle of a surface of the powder is not less than 90 degrees.

According to the present mode, on the surface of the insoluble powder on which the bubbles emerge, a low-adhesion energy surface whose water contact angle is not less than 90 degrees is configured to be provided. This makes it possible to prevent the bubbles emerged on the surface of the powder from becoming enlarged due to extension or joining with other bubbles on the surface of the powder, so that the bubbles are more likely to be retained in a state of small bubbles similar to a lens shape or a ball shape. Thus, by accelerating generation of a multitude of small bubbles, it is possible to further improve prevention effect of noises or the like which arise from a shockwave generated during disappearance of large bubbles due to cavitation described above.

According to the present invention, the insoluble powder which exists in the sealed fluid provides a bubble nucleus, so that when vibration is input and pressure within the primary fluid chamber is decreased, small bubbles are readily generated in a dispersed way. Accordingly, the bubbles will absorb and reduce the negative pressure so as to effectively minimize noises or vibrations caused by cavitation. In particular, without considerably changing the structure of each component that makes up the fluid-filled vibration damping device, a remedy for cavitation noises can be realized easily and efficiently.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

An embodiment of the present invention will be described below in reference to the drawings.

Figure 1:
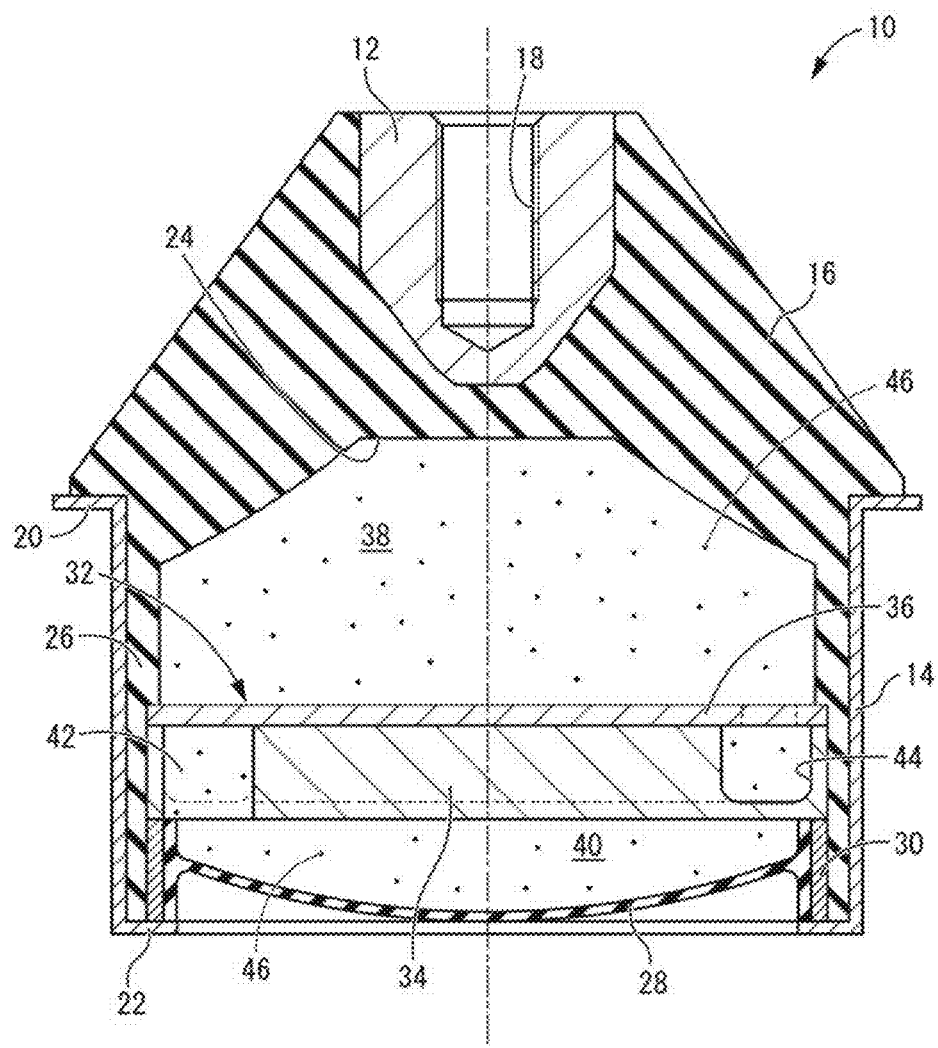
FIG. 1 is an elevational view in axial or vertical cross section of a fluid-filled vibration damping device in the form of an engine mount as a first embodiment of the present invention.

Referring to FIG. 1, there is depicted an automotive engine mount 10 as a first embodiment of the fluid-filled vibration damping device constructed according to the present invention. The engine mount 10 has a construction in which a first mounting member 12 and a second mounting member 14 are elastically connected by a main rubber elastic body 16. One of the first mounting member 12 and the second mounting member 14 is mounted on the power unit side while the other is mounted onto the vehicle body to provide the power unit with vibration-damped support against the vehicle body of an automobile. In the description hereinbelow, as a general rule the vertical direction refers to the vertical direction in FIG. 1, which coincides with the direction of extension of the elastic principal axis, namely, the center axis of the engine mount 10.

Described more specifically, the first mounting member 12 has a round short pillar shape that extends in the vertical direction, and its axially lower end portion has an inverted frustoconical shape which is reduced in diameter towards the bottom. In addition, the first mounting member 12 includes on its center axis a fastening bolt hole 18 that opens onto the upper end face of the first mounting member 12. By means of a fastening bolt being threaded onto the fastening bolt hole 18, the first mounting member 12 is configured to be secured to the power unit.

The second mounting member 14 has a large-diameter, generally round tubular shape that extends in the vertical direction, and is configured to be secured to the vehicle body via, for example, a mounting bracket (not shown). In addition, the second mounting member 14 includes at its upper rim of the opening a flange portion 20 that flares peripherally outward, while including at its lower rim of the opening an annular detent portion 22 that projects peripherally inward.

The first mounting member 12 is separated axially upward from the second mounting member 14 and positioned generally coaxially therewith.

The main rubber elastic body 16 has a generally frustoconical shape. The first mounting member 12 is embedded and bonded to the center portion of the small-diameter side end of the main rubber elastic body 16, while to the outside peripheral face of the large-diameter side end thereof, the inside peripheral face of the upper end portion of the second mounting member 14 and the upper face of the flange portion 20 are bonded. With this arrangement the first mounting member 12 and the second mounting member 14 are elastic-ally connected by the main rubber elastic body 16.

Note that the main rubber elastic body 16 takes the form of an integrally vulcanization molded component incorporating the first and second mounting members 12, 14 which are made of a rigid material such as metal or the like. Additionally, the main rubber elastic body 16 includes a center recess 24 of an inverted, generally bowl shape that opens onto its large-diameter end face. Furthermore, a seal rubber layer 26 is integrally formed with the main rubber elastic body 16 so as to extend axially downward from the rim of the opening of the center recess 24, and covers the inside peripheral face of the second mounting member 14 over the substantial entirety thereof.

Moreover, a flexible film 28 made of thin-walled rubber film or the like is disposed to the lower opening of the second mounting member 14. To the outside peripheral face of the flexible film 28, a mating fit fitting 30 of ring shape is bonded by vulcanization. The mating fit fitting 30 is secured fitting into the lower opening of the second mounting member 14, so that the lower opening of the second mounting member 14 is fluid-tightly sealed by the flexible film 28. Note that the mating fit fitting 30 is prevented from slipping out from the second mounting member 14 by being detained by the annular detent portion 22.

By so doing, inside the second mounting member 14, between the opposed faces of the main rubber elastic body 16 and the flexible film 28 there is formed a fluid-filled area that is sealed off from the external space and filled with a non-compressible scaled fluid. While any sealed fluid is acceptable as long as vibration damping effect can be exhibited on the basis of flow action of the fluid, in consideration of operation efficiency during handling or the like, it is preferable to employ a hydrophilic liquid. In general, in addition to water, preferred examples are ethylene glycol, propylene glycol, alkylene glycol, polyalkylene glycol or the like. In particular, a low-viscosity fluid having viscosity of 0.1 Pa·s or lower is preferred.

The fluid-filled area filled with the above-mentioned sealed fluid houses a partition member 32. The partition member 32 is a rigid component made of metal, resin, or the like, and is constituted by a partition member body 34 of thick-walled, generally circular disk shape and a cover plate 36 of thin-wailed, generally the same plane shape as the partition member body 34 being overlapped on the partition member body 34.

The partition member 32 is fitted into and attached to the second mounting member 14 so as to extend in the axis-perpendicular direction at the axially medial section of the second mounting member 14. Thus, the outside peripheral face of the partition member 32 is secured fitting onto the inside peripheral face of the second mounting member 14 via the seal rubber layer 26. The seal rubber layer 26 is provided with a step at its axially medial section, and the partition member 32 is pinched between the step and the mating fit fitting 30, so as to be positioned with respect to the second mounting member 14 in the axial direction.

With this arrangement, the fluid-filled area is divided to the upper and lower sides by the partition member 32, so that above the partition member 32, there is formed a primary fluid chamber 38 whose wall is partially constituted by the main rubber elastic body 16 and which gives rise to internal pressure fluctuations based on elastic deformation of a main rubber elastic body 16 at times of vibration input. Meanwhile, below the partition member 32, there is formed an auxiliary fluid chamber 40 whose wall is partially constituted by the flexible film 28 and which readily permits changes in volume so as to avoid pressure fluctuations and be kept at the approximately atmospheric pressure. Due to pressure fluctuations within the primary fluid chamber 38, relative pressure differentials arise between primary fluid chamber 38 and the auxiliary fluid chamber 40.

In addition, the partition member 32 includes in its outside peripheral portion an orifice passage 42 that extends for a prescribed length in the circumferential direction, and fluid flow is permitted between the primary fluid chamber 38 and the auxiliary fluid chamber 40 through the orifice passage 42. In the present embodiment, an upper groove 44 is formed opening upward in the outside peripheral portion of the partition member body 34 while extending just short of once around the circumference, and is covered by the cover plate 36. This arrangement forms the orifice passage 42 whose one end communicates with the primary fluid chamber 38 while the other end thereof communicates with the auxiliary fluid chamber 40.

At times of vibration input, fluid flow will be produced through the orifice passage 42 based on relative pressure fluctuations induced between the primary fluid chamber 38 and the auxiliary fluid chamber 40. Thus, based on the resonance action of the fluid, vibration damping effect is exhibited against vibrations in a prescribed frequency range to which the orifice passage 42 is tuned.

Moreover, an insoluble powder 46 is mixed in the sealed fluid filling the primary fluid chamber 38 and the auxiliary fluid chamber 40. Because of its insolubility, the surface of the powder 46 forms a material interface against the sealed fluid. Thus, when pressure in the primary fluid chamber 38 is remarkably decreased due to input of large impact load or the like, the surface of the powder 46 which is the material interface against the sealed fluid provides a bubble nucleus and works so as to accelerate dispersed generation of bubbles.

In particular, in the case where the liquid having the aforementioned polarity (hydrophilic property) is employed as the sealed fluid, it is desirable to employ the powder 46 whose surface is water repellent. By so doing, accelerating action for dispersed generation of the bubbles will be more effectively exhibited. To obtain the powder 46 having a water-repellent surface, it is also possible to employ a water-repellent material as the powder material itself.

As the water-repellent material, for example, fluorine-based resins such as polytetrafluoroethylene (PTFE), fluorinated ethylene-propylene copolymer resin (FEP), tetrafluoroethylene-perfluoroalkylvinyl ether copolymer resin (PFA), polychlorotrifluoroethylene (PCTFE), polyvinylidene fluoride (PVDF), poly vinyl fluoride (PVF), and PTFE/PFA composite coating, or silicone-based materials, or particles composed of mixture of these two types of particles, are preferably employed because of having good hydrophobic property with excellent durability. Note that these fluorine-based resins or the like exhibit oil repellency as well as water repellency. Thus, even if in the case where a non-polar (hydrophobic) sealed fluid is employed, use of the fluorine-based resin makes it possible to effectively form a low-adhesion energy surface as the interface that provides a bubble nucleus and accelerates dispersed generation of the bubbles on the surface of the powder 46.

Size, specific shape or the like of the powder 46 is not limited in particular. However, if the powder 46 is too small, there is concern that operation efficiency of handling will be deteriorated, or manufacture will be difficult or the like. On the other hand, if the powder 46 is too large, there is concern about rubbing due to contact against each component that makes up the fluid-filled area, or an adverse effect on the fluid fluidity, or the like. Therefore, the powder 46 having an average particle size 0.01-5000 μm is practical and preferably used.

In addition, as long as a bit of the powder 46 exists within the primary fluid chamber 38, the aforementioned accelerating effect for dispersed generation of the bubbles can be exhibited, and the lower limit value of the amount of the mixed powder 46 is not limited. However, in order to obtain practical effect thereof, it is desirable that the powder 46 be mixed at not less than 0.01 weight % in relation to the sealed fluid.

Meanwhile, even if the amount of the mixed powder 46 increases, the powder 46 will not have a significant effect on the fluidity of the sealed fluid because of their small particle size. However, in consideration of rubbing due to contact against the each component or an adverse effect on the fluid fluidity, it is desirable that the powder 46 be mixed in the amount of not more than 100 parts by weight in relation to the sealed fluid.

Furthermore, in order to advantageously obtain the aforementioned accelerating effect for dispersed generation of the bubbles, it is not desirable that all of the powder 46 be maintained in a settled state within the primary fluid chamber 38. Specifically, if is preferable that, at least at times of vibration input, there exists the powder 46 which is in a floating state within the primary fluid chamber 38.

The floating state of the powder 46 can be realized not only by the mass (the specific gravity in relation to the sealed fluid) of the powder 46 but by adjusting the surface texture of the powder 46. For example, in the case where a hydrophilic sealed fluid is employed, it is possible to change the setting of the buoyancy of the powder 46 within the sealed fluid by adjusting the level of water repellency of the surface of the powder 46. In particular, by employing the powder 46 which is composed of the material having a specific gravity greater than 1 with the sealed fluid as a standard and is able to float up within the sealed fluid owing to the action of the water repellency of the surface thereof the degree of floating within the sealed fluid can be set and adjusted over a wide area, by adjusting the water repellency of the surface.

With the engine mount 10 constructed in the above manner installed on the vehicle, vibrations in the vertical direction are primarily input across the first mounting member 12 and the second mounting member 14. If the level of the input vibration is that associated with normal driving, effective vibration damping action can be achieved on the basis of fluid flow action or the like through the orifice passage 42 between the primary fluid chamber 38 and the auxiliary fluid chamber 40.

On the other hand, when the vehicle passes the steps or the like and impact load is input to the engine mount 10, excessive pressure change suddenly arises within the primary fluid chamber 38, which causes cavitation and noises resulting therefrom that tend to be a problem. Here, in the engine mount 10 according to the present embodiment, the aforementioned powder 46 is mixed in the sealed fluid. Thus, a multitude of bubbles emerge in a dispersed way before generation of large bubbles due to cavitation.

Then, the bubbles which emerged in a dispersed way absorb and ameliorate the level of pressure change within the primary fluid chamber 38, thereby reducing the marked pressure drop in the primary fluid chamber 38. As a result, generation of huge bubbles due to cavitation will be prevented, and hence noises or vibrations attributed to the cavitation are effectively reduced.

Especially with the engine mount 10 according to the present embodiment, in combination with the hydrophilic sealed fluid, the powder 46 having the water-repellent surface is employed. Thus, on the surface of each powder 46 that exists in a dispersed state within the primary fluid chamber 38, the low-adhesion energy surface whose water contact angle is small is formed. The bubbles which emerged on the low-adhesion energy surface is more effectively retained thereby, so as to more stably attain cavitation preventing effect through amelioration of the pressure change within the primary fluid chamber 38.

Moreover, for the engine mount 10 according to the present embodiment, it is possible to employ the powder 46 to which water repellency is imparted so that water contact angle θ is not less than 90 degrees with respect to the bubbles which emerged on the surface of the powder 46 that comprises the low-adhesion energy surface. This makes it possible to more stably retain the bubbles which emerged on the surface of the powder 46 in a shape similar to a lens shape or a boll shape, and to more effectively prevent the bubbles from spreading in a flat, extended shape on the surface of the powder 46, or, in association therewith, from becoming enlarged through joining with other bubbles. As a result, the generated bubbles are less likely to disappear during pressure fluctuations in the primary fluid chamber 38 and are readily retained in a small size in a stable manner. This will more effectively prevent generation of huge bubbles due to cavitation caused by amelioration of the pressure change in the primary fluid chamber 38 in an even more stable manner.

Note that the effect for preventing generation of huge bubbles due to cavitation, which is exhibited by the powder 46 based on dispersed generation accelerating action of bubbles as described above, is achieved based on the action within the primary fluid chamber 38 in which decrease in pressure during vibration input causes generation of bubbles. Therefore, it is acceptable as long as the powder 46 is mixed at least in the sealed fluid of the primary fluid chamber 38. However, in the present embodiment, the primary fluid chamber 38 and the auxiliary fluid chamber 40 communicate with each other through the orifice passage 42 having a passage cross sectional area sufficiently larger than the powder 46 and fluid flow is permitted between the fluid chambers 38, 40. Thus, the powder 46 is mixed in a dispersed way over the entire fluid-filled area including the primary fluid chamber 38 and the auxiliary fluid chamber 40. In particular, in the case where the vertical direction in FIG. 1 approximately coincides with the vertical direction with the engine mount 10 installed so that the primary fluid chamber 38 is positioned above the auxiliary fluid chamber 40 in that installed state, it is desirable to employ the powder 46 that floats around or floats up without settling even in the stationary state. By so doing, the powder 46 can more stably exists within the primary fluid chamber 38.

EXAMPLES

Figure 2:
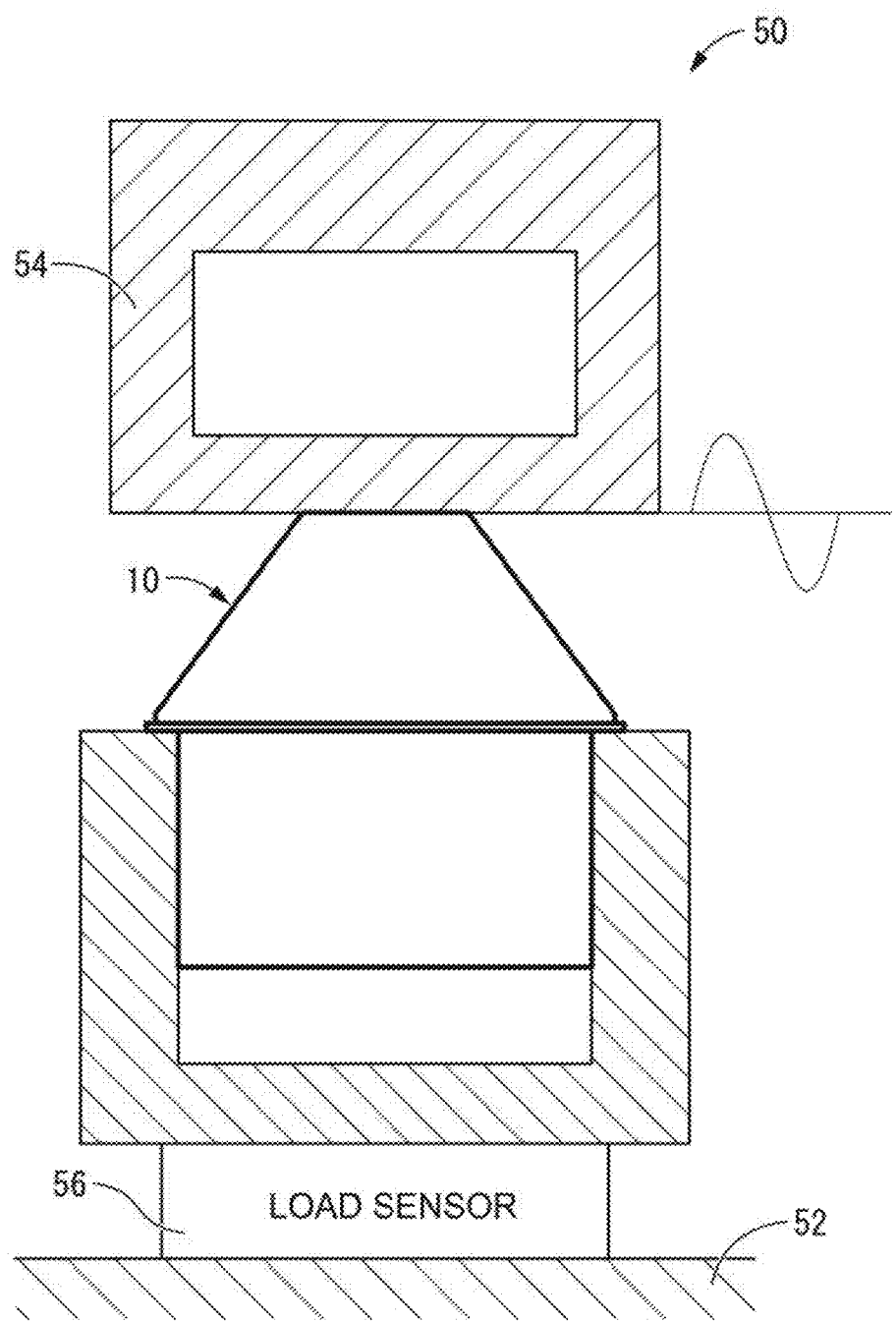
FIG. 2 is a view suitable for explaining a test apparatus used for measuring vibration damping characteristics of the engine mount of FIG. 1.

In order to confirm the effect of the present invention, engine mounts constructed according to the embodiment described above were produced. The engine mounts were set in a test apparatus 50 as depicted in FIG. 2, and vibration damping characteristics were actually measured. Table 1 below shows the test results obtained. As shown in Table 1, each of the engine mounts, which are the test objects, employed a mixture of ethylene glycol and propylene glycol as the sealed fluid. Meanwhile, as the powder, employed was LUBRON (registered trademark) made by Daikin Industries, Ltd., which is polytetrafluoroethylene (PTFE). The average particle size of the employed LUBRON was approximately 5 μm.

The employed test apparatus 50 was such that the engine mount 10 was set between a base member 52 and an oscillator 54, and then the transmitted load transmitted from the oscillator 54 to the base member 52 via the engine mount 10 was detected by a load sensor 56. The detection signals obtained by the load sensor 56 were processed through a high pass filter (500 Hz), so that the vibration loads within the target vibration band were detected. During the tests, a pressure sensor was located in the primary fluid chamber and pressure changes within the primary fluid chamber were also actually measured together with changes of the transmitted load with respect to the oscillating displacement of the oscillator 54.

Figure 3:
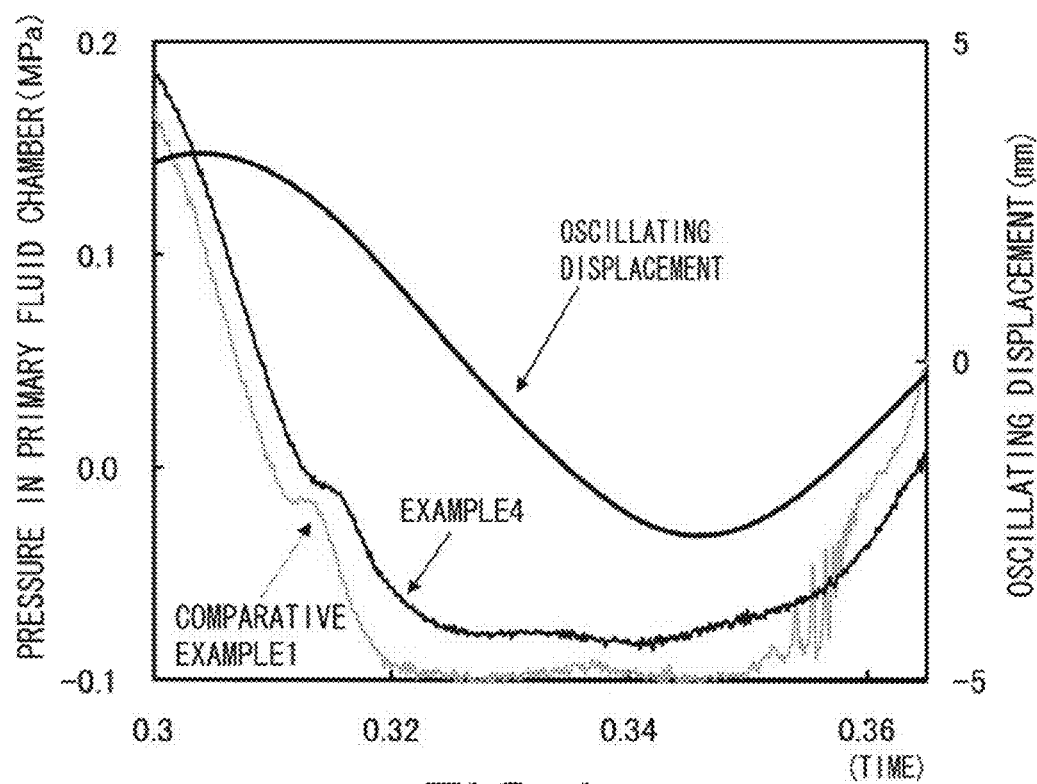
FIG. 3 is a graph showing pressure in a primary fluid chamber and oscillating displacement which are results of comparison between Example 4 and Comparative Example 1.
Figure 4:
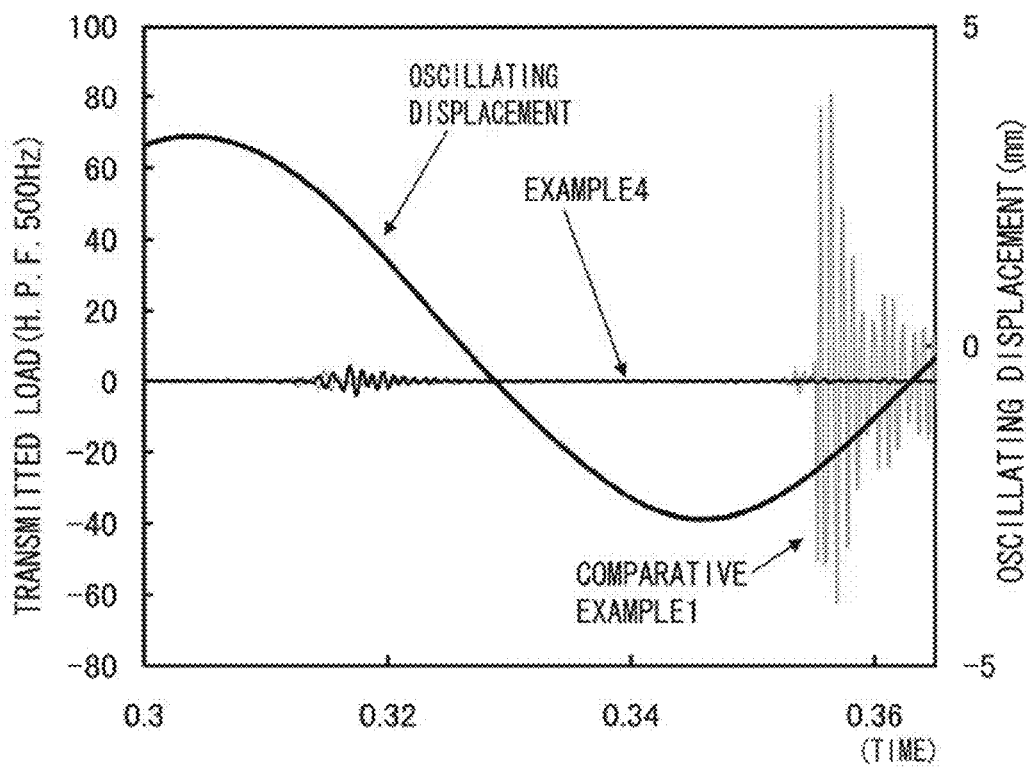
FIG. 4 is a graph showing transmitted load and oscillating displacement, which are results of comparison between Example 4 and Comparative Example 1.

Table 1 shows the results obtained by these tests, while FIGS. 3 and 4 show the measurement results of Example 4 together with those of Comparative Example 1 in Table 1.

TABLE 1

| | | | Comparative Example 1 | Example 1 | Example 2 | Example 3 | Example 4 | Example 5 |
|---|---|---|---|---|---|---|---|---|
| Sealed liquid | 1st liquid | Ethylene glycol | 70 | 70 | 70 | 70 | 70 | 70 |
| | 2nd liquid | Propylene glycol | 30 | 30 | 30 | 30 | 30 | 30 |
| Added powder | Water-repellent powder (wt %) | | 0 | 0.01 | 0.1 | 1 | 3 | 6 |
| Transmitted load | | | 100 | 79 | 34 | 12 | 9 | 8 |

NOTE:
Product name of powder Water-repellent powder: LUBRON$_{TM}$ L-5 made by Daikin Industries, Ltd.

From these measurement results, it was demonstrated that by using the sealed fluid in which an insoluble powder was mixed according to the present invention, it is possible to decrease pressure drop in the primary fluid chamber during input of excessive vibration load, thereby minimizing occurrence of noises or the like due to the jarring load.

What is claimed is:

1. A fluid-filled vibration damping device comprising:
a primary fluid chamber which gives rise to internal pressure fluctuations based on deformation of a main rubber elastic body at times of vibration input;
an auxiliary fluid chamber which gives rise to pressure differentials relative to the primary fluid chamber at times of vibration input;
an orifice passage which permits a low-viscosity, non-compressible sealed fluid filling the primary fluid chamber and the auxiliary fluid chamber to flow between the two fluid chambers; and
an insoluble powder mixed in the sealed fluid filling the primary fluid chamber which provides a bubble nucleus and accelerates dispersed generation of bubbles when pressure within the primary fluid chamber is decreased,
wherein the insoluble powder is composed of particles consisting of only (i) fluorine-based resins, (ii) silicone-based materials, or (iii) fluorine-based resins and silicone-based materials, and
wherein the insoluble powder is configured to function as a bubble nucleus so that a multitude of smaller bubbles emerge in a dispersed manner before larger bubbles are generated due to cavitation within the primary fluid chamber.

2. The fluid-filled vibration damping device according to claim 1, wherein the powder is in a floating state within the sealed fluid in the primary fluid chamber at least at times of vibration input.

3. The fluid-filled vibration damping device according to claim 1, wherein the sealed fluid is hydrophilic, and a surface of the powder is water repellent.

4. The fluid-filled vibration damping device according to claim 3, wherein the powder has a specific gravity greater than 1 with the sealed fluid as a standard, and some of the powder floats up without settling within the sealed fluid based on water repellency of the surface of the powder even in a stationary state.

5. The fluid-filled vibration damping device according to claim 1, wherein the powder is mixed at not less than 0.01 weight % in relation to the sealed fluid.

6. The fluid-filled vibration damping device according to claim 1, wherein the powder is mixed in an amount of not more than 100 parts by weight in relation to the sealed fluid.

7. The fluid-filled vibration damping device according to claim 1, wherein the powder has an average particle size of 0.01-5000 μm.

8. The fluid-filled vibration damping device according to claim 1, wherein
the sealed fluid is hydrophilic,
the powder is composed of a water-repellent material, and
water repellency of the water-repellent material is exhibited on a surface of the powder.

9. The fluid-filled vibration damping device according to claim 1, wherein a water contact angle of a surface of the powder is not less than 90 degrees.

10. The fluid-filled vibration damping device according to claim 1, wherein the insoluble powder comprises fluorine-based resins.

* * * * *